United States Patent
Paling et al.

(10) Patent No.: US 7,846,242 B2
(45) Date of Patent: Dec. 7, 2010

(54) AIR DRYER CARTRIDGE (75) Inventors: Mark Paling, Leeds (GB); Andrew G. L. Blackwood, Shipley (GB); Ignitius Milomo, Bradford (GB); Stephan Niemeyer, Ludwigsburg (DE); Christian Fischer, Fellbach (DE); Andreas Stephan, Speyer (DE)

(73) Assignee: Wabco GmbH & Co. Ohg., Hannover (DE)

( * ) Notice: Subject to any disclaimer, the term of this patent is extended or adjusted under 35 U.S.C. 154(b) by 916 days.

(21) Appl. No.: 10/554,922

(22) PCT Filed: May 19, 2004

(86) PCT No.: PCT/GB2004/002129

§ 371 (c)(1),
(2), (4) Date: Nov. 6, 2006

(87) PCT Pub. No.: WO2004/103509

PCT Pub. Date: Dec. 2, 2004

(65) Prior Publication Data

US 2007/0144350 A1    Jun. 28, 2007

(30) Foreign Application Priority Data

May 19, 2003 (GB) .................................. 0311471.7
Jun. 25, 2003 (GB) .................................. 0314829.3
Sep. 15, 2003 (DE) .................................. 103 42 871

(51) Int. Cl.
B01D 53/02 (2006.01)

(52) U.S. Cl. .............................. 96/134; 55/392; 55/428; 55/485; 55/486; 55/DIG. 17; 96/144

(58) Field of Classification Search .................. 96/134, 96/144; 55/392, 428, 485, 486, DIG. 17
See application file for complete search history.

(56) References Cited

U.S. PATENT DOCUMENTS 1,430,825 A * 10/1922 Mason et al. ............... 172/626

(Continued)

FOREIGN PATENT DOCUMENTS

DE    41 39 680 A1    6/1993

(Continued)

OTHER PUBLICATIONS

International Search Report PCT/6B2004/002129 mailed Jan. 10, 2005.

*Primary Examiner*—Duane Smith
*Assistant Examiner*—Christopher P Jones
(74) *Attorney, Agent, or Firm*—Nixon Peabody LLP; Jeffrey L. Costellia (57) ABSTRACT An air dryer desiccant cartridge, the cartridge comprising a base having an inlet and an outlet, and a casing connected to the base to define a cavity there between, wherein the cavity contains a filter and a desiccant, the filter being arranged upstream of the desiccant such that during normal operation fluid flow entering the cartridge through the inlet passes through the filter and then on to the desiccant before reaching the outlet, and during purging of the cartridge purge flow entering the outlet passes through the desiccant before reaching the filter, wherein further the cartridge includes a valve operable to permit a portion of the purge flow to bypass the filter.

29 Claims, 8 Drawing Sheets

U.S. PATENT DOCUMENTS

| | | | |
|---|---|---|---|
| 3,796,025 A | | 3/1974 | Kasten |
| 4,029,486 A | * | 6/1977 | Frantz .................... 96/137 |
| 4,071,337 A | * | 1/1978 | Evans .................... 96/114 |
| 4,468,239 A | * | 8/1984 | Frantz .................... 96/114 |
| 4,564,376 A | * | 1/1986 | Billiet .................... 55/486 |
| 4,832,836 A | | 5/1989 | Selsdon |
| 4,865,815 A | * | 9/1989 | Martin et al. .............. 422/122 |
| 5,286,283 A | | 2/1994 | Goodell |
| 5,334,230 A | * | 8/1994 | Sloka .................... 96/113 |
| 5,595,588 A | | 1/1997 | Blevins |
| 5,607,500 A | * | 3/1997 | Shamine et al. ............ 96/144 |
| 5,779,772 A | | 7/1998 | Unger et al. |
| 5,961,698 A | * | 10/1999 | Dossaji et al. ............. 96/130 |
| 6,014,820 A | * | 1/2000 | Jones et al. .................. 34/548 |
| 6,094,836 A | * | 8/2000 | Mahoney et al. ............. 34/80 |
| 6,484,413 B1 | | 11/2002 | Larsson |
| 6,581,297 B1 | * | 6/2003 | Ginder ..................... 34/79 |
| 6,723,154 B2 | * | 4/2004 | Olsson et al. ............... 95/118 |
| 6,786,953 B2 | * | 9/2004 | Fornof et al. ............... 95/122 |
| 6,951,581 B2 | * | 10/2005 | Fornof et al. ............... 95/122 |
| 2002/0194991 A1 | * | 12/2002 | Olsson et al. ............... 95/118 |
| 2004/0094036 A1 | * | 5/2004 | Nichols et al. .............. 95/148 |
| 2007/0144350 A1 | * | 6/2007 | Paling ...................... 96/134 |
| 2007/0180999 A1 | * | 8/2007 | Paling et al. ................ 96/134 |
| 2008/0307965 A1 | * | 12/2008 | Hoffman et al. ............. 95/119 |

FOREIGN PATENT DOCUMENTS

| | | |
|---|---|---|
| DE | 196 27 889 A1 | 1/1998 |
| EP | 1 048 541 A1 | 11/2000 |
| EP | 1 239 145 A2 | 9/2002 |
| GB | 1 430 825 | 4/1976 |

* cited by examiner

AIR DRYER CARTRIDGE

BACKGROUND OF THE INVENTION

1. Field of the Invention

The present invention relates to a vehicle air dryer and in particular to a vehicle air dryer desiccant cartridge.

2. Description of the Related Art

The provision of air drying apparatus, hereinafter referred to as an air dryer, in vehicle air systems is well known. The air dryer apparatus is typically positioned intermediate an air source, for example a compressor, and a reservoir. The air dryer includes a desiccant material, for example a moisture adsorbing material such as silica gel, which removes moisture from the air supplied by the compressor so as to prevent said moisture being deposited downstream in the vehicle air system where it may over time damage components of the air system. So as to address the build up of moisture in the desiccant material the air dryer is periodically purged to atmosphere with dry air from the reservoir. Purging of the desiccant is typically undertaken during periods when the compressor is idle and no significant demands for dry air are being made of the reservoir. The desiccant material is typically provided in a removable canister, hereinafter referred to as a cartridge, which is releasably attached to the air dryer. The cartridge is periodically replaced so as to take into account degradation in the performance of the desiccant material over time.

It is not unknown for the air supplied by the compressor to include a mist of very fine oil droplets. The oil droplets are generated from the lubricating oil present in the compressor by the reciprocating action of the compressor. The oil mist typically passes through the air dryer and is subsequently deposited in the reservoir or further downstream in vehicle air system. While oil deposited in this manner is much less likely to damage air system components in the same manner as moisture, its deposit may lead over time to such problems as, for example, the constriction of narrow passageways in air system components and the degradation of elastomeric seals. It is an object of the present invention to provide an improved air dryer which seeks to prevent the transmission of oil therethrough.

SUMMARY OF THE INVENTION

According to a first aspect of the present invention there is provided an air dryer desiccant cartridge, the cartridge comprising a base having an inlet and an outlet, a casing connected to the base to define a cavity therebetween, wherein the cavity contains a filter and a desiccant, the filter being arranged upstream of the desiccant such that during normal operation of the cartridge fluid flow entering the cartridge through the inlet passes through the filter and then on to the desiccant before reaching the outlet, and during purging of the cartridge purge flow entering the outlet passes through the desiccant before reaching the filter, wherein further the cartridge includes a valve operable to permit a portion of the purge flow to bypass the filter.

The inclusion of the valve ensures that all of the fluid entering the cartridge during normal operation is routed through the filter before reaching the desiccant, while permitting the purge flow to be split such that a portion of the purge flow is directed through the filter in reverse direction, while the remainder of the purge flow bypasses the filter.

The valve preferably includes a valve member which is urged to a closed position, thereby preventing the flow of fluid through the valve, by fluid flow entering the cartridge through the inlet. The valve member may take the form of a flexible member. In such an embodiment the flexible member may be provided with a proximal portion fixed to a feature of the cartridge, and a movable distal portion. In such an embodiment the flexible member may be positioned in a lower region of the cartridge between the filter and the base. In an alternative embodiment the valve may comprise a flow passage having a movable valve member contained therein.

The cartridge may further include a sump associated with the filter. The sump serves to collect liquid removed from incoming airflow entering the cartridge. Preferably the sump is located in the vicinity of the valve such that purge flow directed through the valve entrains any liquid contained in the sump.

According to a second aspect of the present invention there is provided an air dryer desiccant cartridge, the cartridge comprising a base having an inlet and an outlet, a casing connected to the base to define a cavity therebetween, wherein the cavity contains a filter, a container within which there is provided a desiccant and a spring arranged to urge the container and filter towards the base, wherein the filter is positioned intermediate the container and the base such that at least some of the force applied to the container and desiccant by the spring is transmitted to the base through the filter.

The present invention thereby provides a desiccant cartridge wherein the desiccant container and the filter are stacked one on top of the other and the force of the spring is utilised to locate the container and filter both relative to one another and to the base.

In such an embodiment the filter may comprise a structural member upon which there is mounted a filter material. Alternatively the filter material may be mounted on more than one structural member In a preferred embodiment the filter is cylindrical comprising an annular structural member upon which there is carried a correspondingly annular filter material arrangement. Preferably the structural member is provided radially inwardly of the filter material.

The desiccant container may be substantially cylindrical. In such an embodiment the container may be at least partially received with the annulus of the filter. The container may comprise a first portion having a diameter less than that of the annulus and a second portion having a diameter greater than that of the annulus. In such an embodiment the transitional portion of the container between the first and second portions may define a seat configured to receive the filter.

According to a third aspect of the present invention there is provided a base member for a desiccant cartridge, the base member comprising an upper portion configured to receive a filter of a desiccant cartridge, and a lower portion adapted to rest against a base of a desiccant cartridge, the lower portion further including a flow passage and a blocking means operable to open and close said flow passage.

In a preferred embodiment the upper portion of the base member is provided with a seat configured to receive and support the filter. The seat may be provided with one or more engagement features which, in use, serve to locate the filter relative to the base member. The engagement features may comprise one or more projections. The aforementioned projections may take the form of one or more sprung fingers. Additionally, the seat may be contoured.

The flow passage may be defined by a discontinuity in the lower portion of the base member. The blocking means may comprise a flexible member spanning said discontinuity. The flexible member may take the form of a skirt or rib of a flexible plastics material. The lower portion may be provided with a plurality of flow passages. In such an embodiment the flow passages may be defined by a plurality of discontinuities.

In an alternative embodiment the lower portion may be provided with a plurality of feet which, in use, rest against the base of a desiccant cartridge, wherein the flow passages are defined between said feet. The base member may be provided with one or more engagement members which, in use, engage one or more features of the base of a desiccant cartridge.

The base member may preferably be manufactured from a plastics material by an injection moulding operation. The flexible rib or skirt may advantageously be co-moulded with the base member.

According to a fourth aspect of the present invention there is provided a filter assembly adapted to fit between a desiccant cartridge and a housing of an air dryer, the filter assembly comprising a body having an inlet, an outlet and a filter positioned within the body intermediate the inlet and outlet, the body further being provided with seals at the inlet and outlet so as to enable the filter to be connected in a fluid tight manner between the desiccant cartridge and air dryer housing, in use.

The filter assembly described above provides a stand alone component which may optionally be incorporated into an air dryer system to permit the filtering of incoming fluid prior to said fluid reaching the desiccant of an air dryer cartridge. During normal operation of the filter assembly and cartridge fluid flow entering the filter assembly through the inlet passes through the filter and then on to the cartridge through the outlet. During purging of the cartridge and filter assembly purge flow entering the outlet passes through the filter before exiting the filter assembly through the inlet. The filter advantageously acts to remove particulate matter, oil mist and moisture from the incoming air.

In a preferred embodiment the filter assembly is provided with a sump into which liquid removed from the fluid flow by the filter may drain. The filter assembly advantageously further includes a valve operable to permit a portion of the purge flow to bypass the filter.

The inclusion of the valve ensures that all of the fluid entering the filter assembly during normal operation is routed through the filter before reaching the desiccant, while permitting the purge flow to be split such that a portion of the purge flow is directed through the filter in reverse direction, while the remainder of the purge flow bypasses the filter.

The valve preferably includes a valve member which is urged to a closed position, thereby preventing the flow of fluid through the valve, by fluid flow entering the filter assembly through the inlet. The valve may comprise a flow passage having a movable valve member contained therein.

BRIEF DESCRIPTION OF THE DRAWINGS

Embodiments of the present invention will now be described with reference to the accompanying drawings in which:

FIG. 6b shows a perspective view of a seat of the valve of FIG. 6a;

DETAILED DESCRIPTION OF THE INVENTION

Figure 1:
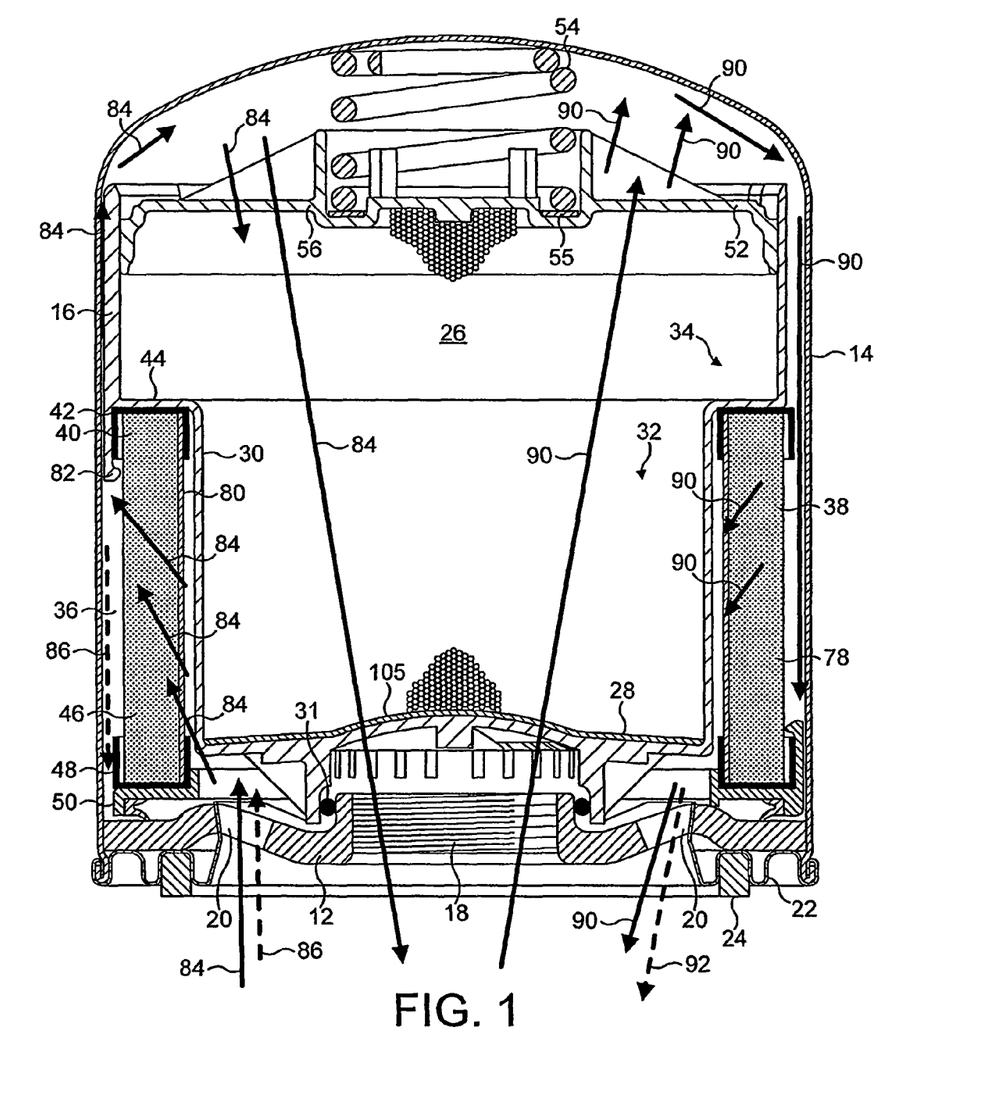
FIG. 1 shows a cross-sectional side view of an air dryer cartridge according to the present invention.

Referring firstly to FIG. 1 shows a cross-sectional view of a desiccant cartridge, generally designated 10, which is constructed in accordance with the present invention. The cartridge 10 includes a base member 12, a casing 14 and an inner cup 16. The base member 12 is provided with a central aperture 18 surrounded by a plurality of secondary apertures 20. The central aperture 18 is threaded in order that the cartridge 10 as a whole can be screw fitted to a complementary threaded spigot of an air dryer housing. The base member 12 is further provided with an annular seal mount 22 which carries an elastomeric seal 24. The seal 24 ensures that, in use, the cartridge 10 fits in a leak tight manner to an air dryer housing.

Within the inner cup 16 there is provided a desiccant matrix 26 which comprises a moisture adsorbing material such as silica gel pellets. The inner cup 16 comprises a perforated base 28 having an upstanding wall 30. An o-ring type seal 31 is provided between the base member 12 and the perforated base 28 of the cup 16 so as to prevent any fluid communication therebetween. As can be seen in FIG. 1 the wall is stepped such that the cup 16 is provided with a lower portion 32 which has a diameter which is less than that of an upper portion 34. The provision of the smaller diameter of the lower portion 32 defines an annular space 36 between the lower portion 32 and the casing 14 within which there is provided an annular filter 38. The filter 38 is provided with an upper end 40 received in a seal 42 which rests against the step 44 in the cup 26, and a lower end 46 which also is received in a seal 48 rests against a seat member 50.

The cartridge 10 is further provided with a perforated lid 52 received in the upper portion 34 of the cup 16 and a spring 54 disposed between the lid 52 and the casing 14. The spring 54 is received in an appropriately shaped seat 56 of the lid 52 and rests against a washer 55

The filter 38 comprises an annular tube of filter material 78 which is attached to a perforated sleeve 80. The sleeve 80 acts as a load bearing member which, in use, transmits the force applied to the filter 38 by the spring 54, washer 55, lid 52 and cup 16 to the seat member 50. The filter material may comprise multiple layers of a porus material and is configured such that it both coalesces liquid droplets, such as oil and water, and traps particulate matter entering the cartridge 10. The seals 42, 48 may be of any appropriate type such as, for example, elastomeric 'O' ring type seals or compressible gasket type seals. In the embodiment shown the seals 42, 48 are provided on carriers which fit around respective ends 40, 46 of the filter 38. The cup 16 is provided with a spaced plurality of fingers 82 (one of which is shown) which engage the upper seal carrier to retain the filter 38 in association with the cup 16.

Figure 2A:
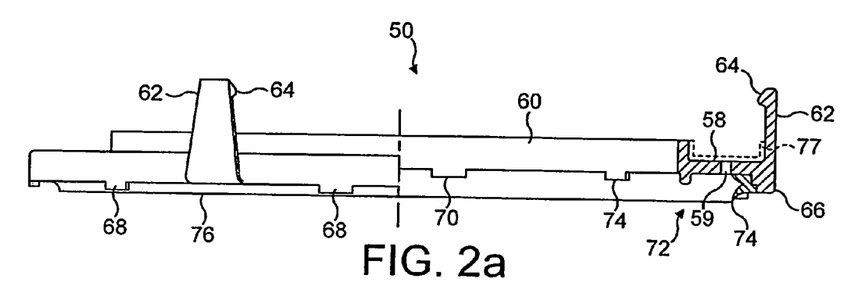
FIG. 2a shows a partial cross-sectional view of a seat member of the cartridge of FIG. 1.

The seat member 50 is shown in greater detail in FIG. 2a and comprises an annular base 58 having an upstanding wall 60 at an inner edge thereof. The outer edge of the base 58 is provided with a plurality of upstanding fingers 62 each having a projection 64 at their distal end. In the embodiment shown the annular base 58 is substantially flat, however it will be appreciated that the base may be configured so as to assist in the location and positioning of the filter 38 with respect thereto. For example the base 58 may be provided with one or more features, such as projections, which interengage with complementary features of the filter 38. The base 58 may be contoured, for example having a concave or convex shape, to assist with the location and positioning of the filter 38. The fingers 62, in use, are used to retain the seat member 50 in association with the filter 38. The underside of the base 58 is provided at its outer edge with a peripheral rib 66 having provided thereon a number of spaced tabs 68. Similar tabs 70 are provided in a spaced relationship around the inner edge of the underside of the base 58. In use, and as can be seen in FIG. 1, the tabs 68,70 of the seat member 50 rest against the base member 12 and thereby define a number of flow apertures between the tabs 68,70, annular base 58 and base member 12.

The seat member 50 is further provided with a sealing member 72 which extends around the peripheral rib 66. The sealing member 72 includes a flexible lip 74 which, when viewed in cross section, extends both radially inward and downward with respect to the rib. The sealing member 72 typically comprises a flexible plastics material such as, for example, a neoprene rubber material. As can be seen from FIG. 2 the outer edge 76 of the lip 74 extends below the lower faces of the tabs 68 of the rib 66. As will be described in greater detail below, the sealing member may, in use, be used to close the flow apertures defined between the rib tabs 68. The seat member 50 may be formed by a moulding operation from a plastics material, with the sealing member 72 applied thereto by a subsequent moulding operation. This subsequent moulding operation may be utilised to additionally mould another, optional, seal to the annular base 58. The further seal 77, indicated by broken lines, is comprised of the same material as the sealing member 72 and, in use, ensures that a leak tight connection is made between the filter 38 and the seat member 50. The seal 77 is connected to the sealing member 72 through a plurality of through holes 59 provided in the annular base 58.

Figure 2B:
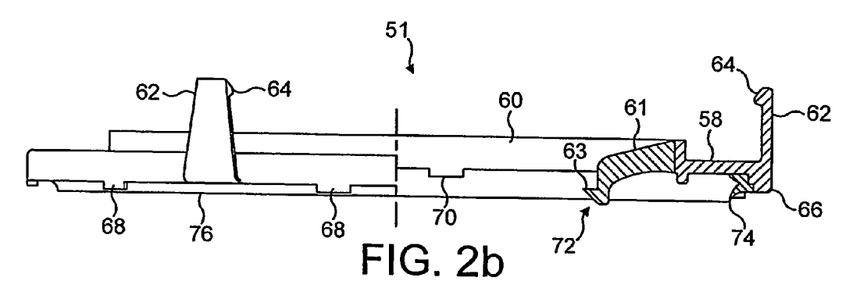
FIG. 2b shows a partial cross-sectional view of an alternative seat member.

FIG. 2b shows an alternative seat member generally designated 51. Features common to the seat member of FIG. 2a are identified with like reference numerals. The seat member 51 differs in that it is provided with a plurality of inwardly directed projections 61 (only one of which is shown) extending from the wall 60. The projections 61 include a barb 63 which, in use, engages with the base member 12 of the cartridge 10 by gripping edges of the secondary apertures 20. The interengagement of the projections 61 and secondary apertures 20 prevents the possibility of the seat member 51 moving axially relative to the base member 12 as a result if differential pressures experienced thereacross. The prevention of axial movement reduces the possibility of the sealing member 72 being displaced under the rib 66. The seat member 51 is shown with the fingers 62, however these may optionally be omitted.

In use the cartridge 10 is attached to the body of an air dryer apparatus (not shown) such that incoming moist air (indicated by arrow 84) and oil mist (indicated by arrow 86) from a compressor is directed into the cartridge 10 through the secondary apertures 20. The moist air and oil mist is directed between the base 28 of the cup 16 to the filter 38. Upon passing through the filter material 78 a significant proportion of any oil mist is removed from the air flow. The filter material 78 acts to remove the oil mist by coalescing the individual droplets forming the mist into larger droplets which are not carried by the air stream passing through the filter material 78. These larger droplets are either retained on or by the filter material 78, or drain from the filter material 78 as indicated by arrow 86 to a peripheral sump 88 defined between the cartridge base 12, the seat member 50 and the casing 14. Advantageously the filter material 78 further serves to remove a portion of the moisture contained in the incoming air in a similar coalescing manner. As with the oil mist, water droplets in the incoming air are coalesced and retained in the filter material 78 or drained to the sump 88.

Figure 3:
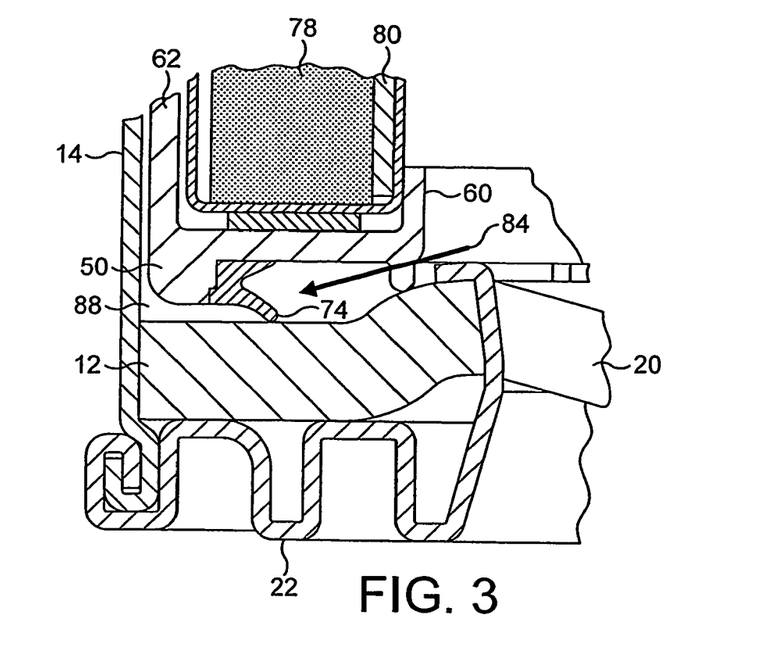
FIG. 3 shows a close up cross-sectional view of a lower portion of the cartridge of FIG. 1.

FIG. 3 shows in magnified detail a lower portion of the cartridge 10 including the sealing member 72 of the seat member 50. During the normal flow of moist air and oil mist through the filter 38 there exists a pressure differential across the filter 38. This pressure differential is exploited by the sealing member 72 to provide a fluid tight seal between the base 12 and the underside of the seat member 50 as shown. The provision of this fluid tight seal ensures that all of the incoming moist air and oil mist must pass through the filter 38.

After passing through the filter 38 the incoming air and its remaining moisture is directed upwardly between the inside wall of the casing 14 and the cup 16 before passing downwardly through the desiccant matrix 26 whereupon the moisture is removed and retained by the material forming the desiccant matrix 26. Further condensation of moisture within the air may occur as the air passes between the inside wall of the casing 14 and the cup 16. The cleaned and dried air then passes through a fleece pad 105 lining the base of the cup 16 and the central aperture 18 of the cartridge 10 to the body of the air dryer apparatus and onwards to a reservoir (not shown).

As described in the introductory paragraphs above, the desiccant material of the cartridge 10 requires to be periodically regenerated with dry air to prevent it from becoming saturated with moisture and hence rendered ineffective. The flow of regenerative dry air through the cartridge is in the direction opposite to that shown for moist air and oil mist and is indicated by arrows 90. Dry regeneration air from the reservoir enters the cartridge 10 through the central aperture 18 before entering the cup 16 and passing through the fleece pad 105 and desiccant matrix 26. The now moist air exits the cup 16 through the lid 52 and passes between the cup 16 and the casing 14 to the filter 38. At this point the regeneration flow splits such that a portion thereof passes through the filter 38, while the remainder bypasses the filter 38 and is utilised to remove any oil and water present in the sump 88 as described below.

Figure 4:
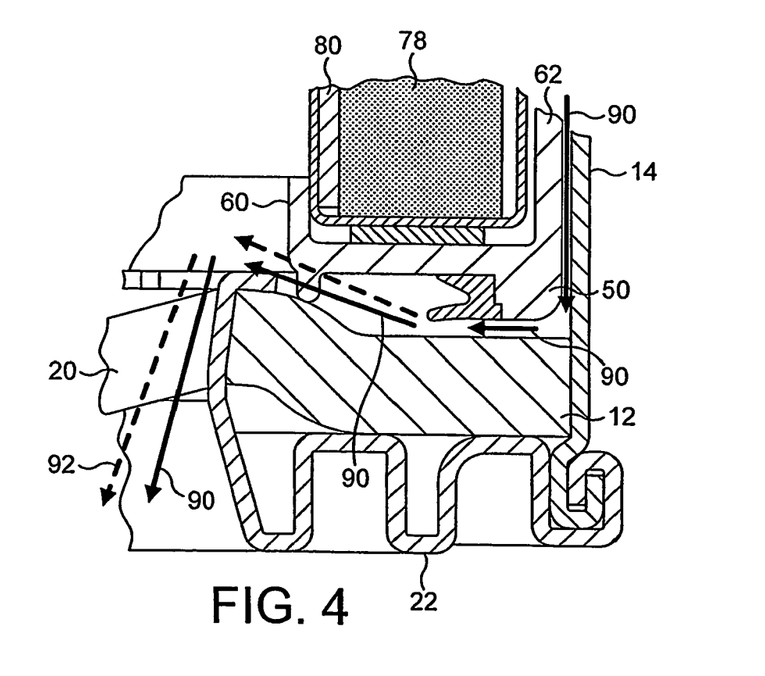
FIG. 4 shows a further close up cross-sectional view of a lower portion of the cartridge of FIG. 1.

FIG. 4 shows in magnified detail a lower portion of the cartridge 10 including the sealing member 72 of the support member 50 during regeneration flow. The portion of the regeneration flow 90 which reaches the sealing member 72 causes the member 72 to deflect upwards and away from the base 12. The regeneration flow 90 is therefore able to flow past the sealing member 72 while at the same time entraining any liquid retained in the sump 88 as indicated by arrow 92. The regeneration flow 90 and entrained liquid 92 exit the cartridge 10 through a secondary aperture 20 are vented to atmosphere. The portion of the regeneration flow 90 which passes through the filter 38 entrains any liquid retained by the filter material 78, as well as any particulate matter, and similarly vents it to atmosphere through a secondary aperture 20. As can be seen in FIG. 4 the split portions of the regeneration flow 90 rejoin one another prior to passing through the secondary aperture 20.

Figure 5:
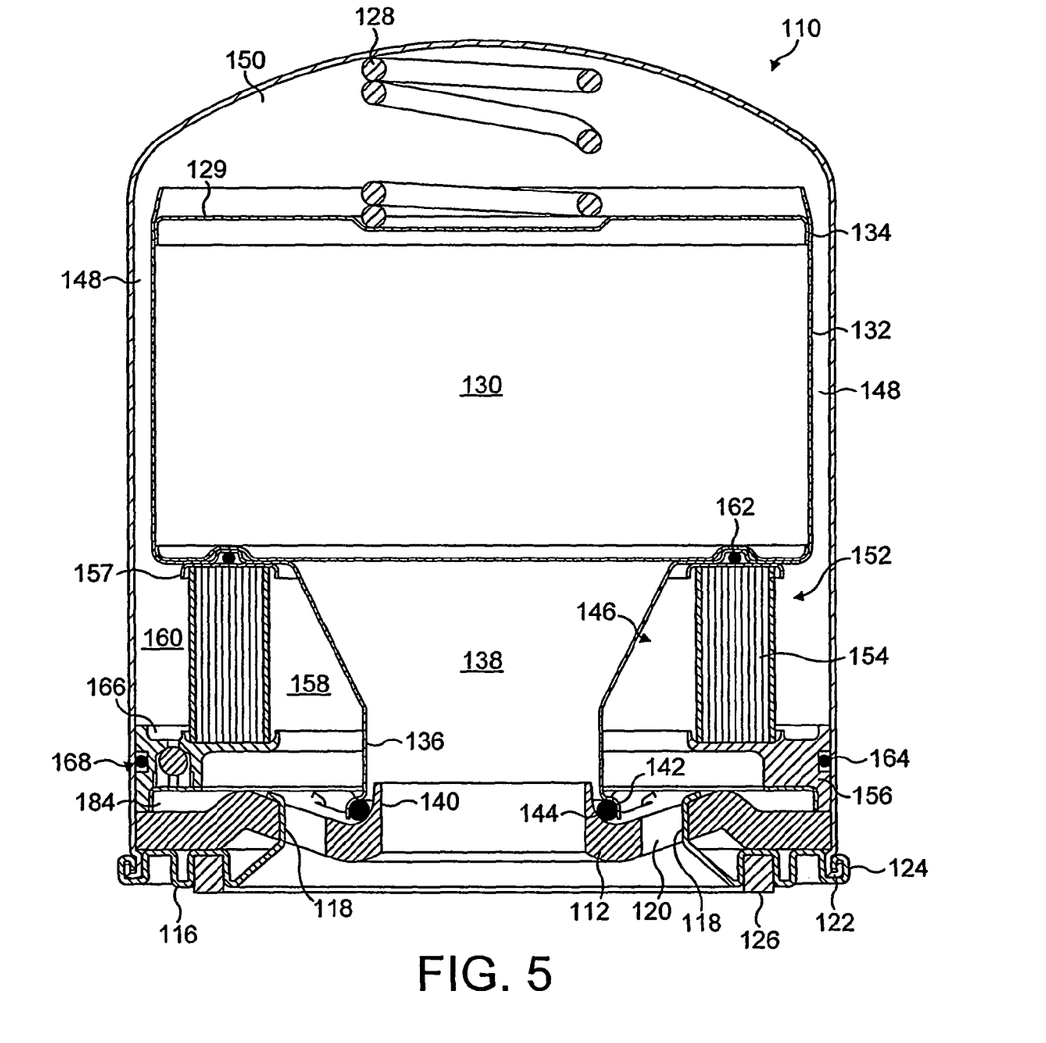
FIG. 5 shows a partial cross-sectional view of an air dryer cartridge according to an alternative embodiment of the present invention.

Referring now to FIG. 5 there is shown an alternative embodiment of an air dryer desiccant cartridge according to an aspect of the present invention and generally designated 110. The cartridge 110 includes a base 112 having connected thereto a casing 114 by a seal mount 116. In the embodiment shown the seal mount 116 is associated with the base 112 by the provision of a plurality of fingers 118 (only one of which is shown) which are received in corresponding through holes 120 of the base 112. In order to retain the casing 114 with the base 112, an edge 122 of the casing 114 is received in a circumferential recess 124 of the seal mount 116, which recess 124 is crimped so as to grip the casing 114. The seal mount 116 further serves to support and retain a seal member 126 which, in use, ensures an air tight seal is made between the cartridge 110 and an air dryer housing (not shown).

The base 112, casing 114 and seal mount 116 define a cavity within which there is provided a desiccant matrix 130. The desiccant matrix 130 is provided within a substantially cylindrical support member 132 comprising a larger diameter portion 134 and a smaller diameter portion 136. The larger diameter portion 134 is configured to receive and support the desiccant matrix 130 in an upper region of the cavity, while the smaller diameter portion defines a channel 138 which is aligned with a centrally positioned aperture 140 of the base 112. The smaller diameter portion 136 of the support member 132 includes a foot 142 which rests upon an o-ring seal 144 of the base 112. An annular inlet chamber 146 is defined between the base 112, casing 114 and smaller diameter portion 136 of the support member 132. The large diameter portion 134 of the support member 132 is sized relative to casing 114 such that an annular passage 148 is provided therearound. The annular passage 148 provides a communication path between the inlet chamber 146 and a space 150 above the desiccant matrix 130. The support member 132 and desiccant matrix 130 are retained in position with the cavity by the provision of a spring 128 acting between a perforated lid 129 overlying the matrix 130 and the casing 114.

The cartridge 110 is further provided with a filter assembly, generally designated 152, which is positioned within the casing 114 between the base 112 and the support member 132. The assembly 152 comprises a filter element 154, a lower filter element support ring 156 and an upper filter support ring 157. The filter element 154 and support rings 156,157 divide the inlet chamber 146 into respective first and second portions 158,160. Seal members 162, 164 are provided so as to prevent the flow of fluid across the interfaces made between the assembly 152, the support member 132 and the casing 114. The support ring 156 is further provided with a sump 166 which is positioned in the second portion 160 of the inlet chamber 146. The sump 166 includes a drain valve 168 which, under certain operating conditions allows liquid collected in the sump 166 to drain to the first portion 158 of the inlet chamber 146.

The filter element 154 comprise a plurality of layers of filter media. The media of each layer may comprise, for example, a mat composed of glass micro fibres or a suitable plastics material. The layers may be in intimate contact with one another or alternatively may be spaced apart by the provision of appropriate spacer means. The filter element has a similar construction to that of the first mentioned embodiment in that it comprises a perforated load bearing support to which the filter media is attached.

Advantageously the cartridge 110 is provided with pressure relief means operable in the event that the filter element 154 becomes blocked. The seal member 162 between the assembly 152 and support member 132 may be adapted to fail in a controlled manner if the pressure differential thereacross exceeds a predetermined value. Alternatively the support member 132 may be arranged to move away from the filter element 154 against the action of the spring 128 to define a flow path therebetween.

Figure 6A:
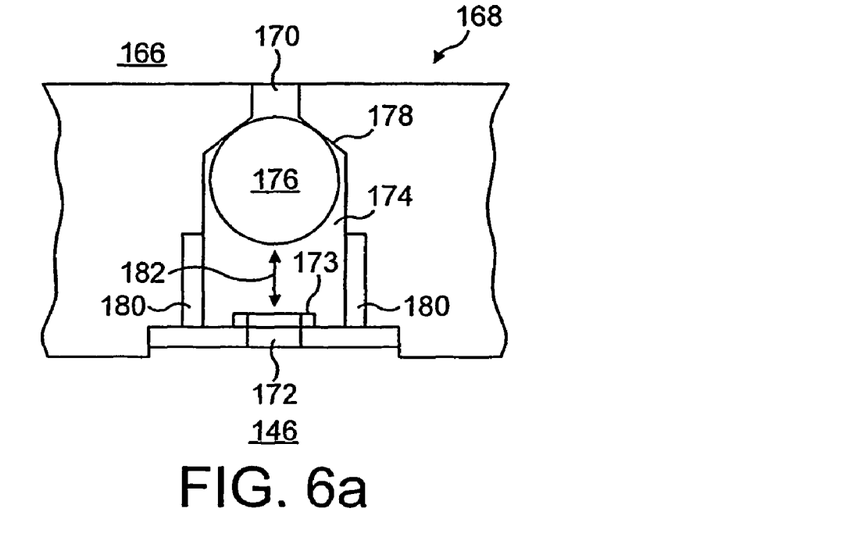
FIG. 6a shows a side view of a valve of the air dryer cartridge of FIG. 5.
Figure 6B:
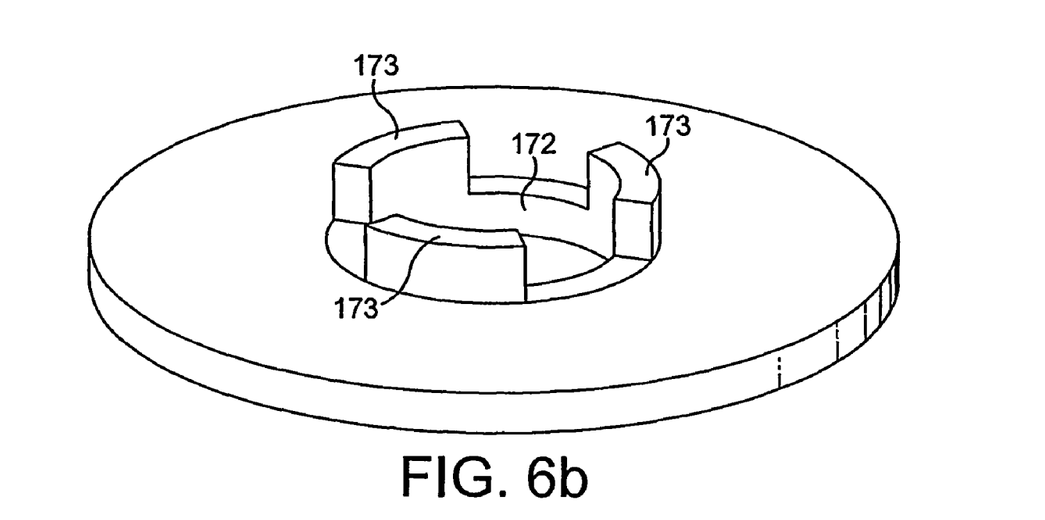

FIGS. 6a and 6b shows the drain valve 168 in greater detail. The valve 168 includes an inlet 170 in fluid communication with the sump 166 and an outlet 172 in fluid communication with the first portion 158 of the inlet chamber 146. Between the inlet 170 and outlet 172 there is provided a valve chamber 174 containing a valve member 176 which, in the embodiment shown, is substantially spherical. The chamber is further provided with a seat 178 for the valve member 176 surrounding the inlet 170, and a plurality of bypass channels 180 adjacent the outlet 172. The valve member 176 is movable longitudinally within the valve chamber 174 as indicated by arrow 182. A plurality of castellations 173 are provided around the outlet 172 so as to ensure that it is not blocked by the valve member 176. In the embodiment shown the valve chamber 174 is substantially perpendicular with respect to the base 112 of the cartridge 110. It will be appreciated that such an arrangement maximises the influence of gravity on the valve member 176 and further promotes the draining of the sump 166 during periods when the compressor is off-load. It will be appreciated that in an alternative embodiment the valve chamber 176 may be inclined.

The operative states of the cartridge 110 will now be described. In use, it will be understood that the cartridge 110 is connected to an air dryer housing. The connection is typically effected by the provision of a threaded portion of the base 112 which is adapted to receive a corresponding threaded portion of an air dryer housing. With the compressor of the air system on load, moist and contaminated air and oil mist is supplied to the first portion 158 of the inlet chamber 146 via the base through holes 120. The moist air and oil mist then passes through the filter element 154 to the second portion 160 of the inlet chamber 146. Air is prevented from passing through the drain valve 168 as the pressure differential across the valve 168 maintains the valve member 176 against the seat 178 and hence closes the inlet 170. Air received in the second portion 160 of the inlet chamber 146 subsequently passes via the annular passage 148 to the space 150 above the desiccant matrix 130. The air then passes through the desiccant matrix 130 whereupon moisture entrained therein is removed. The dry air subsequently exits the cartridge 110 via the channel 138 and aperture 140.

It will be understood that air received in the first portion 158 of the inlet chamber 146 from the compressor is saturated with water and is contaminated with a mist of compressor oil and particulate matter such as dust. The filter element 154 is configured so as to coalesce at least a significant proportion of the oil mist so that it can drain to the sump 166, and to prevent the passage of the particulate matter. As described above in relation to the first embodiment, the filter element 154 further acts to coalesce a portion of the water contained in the incoming air. The coalesced water and oil is initially retained by the filter element 154 and may subsequently drain in to the sump 166. Further condensation can occur in the annular passage 148 as the air cools. Any such condensate is able to drain down the inner wall of the casing 114 to the sump 166.

As described above, the coalesced oil and water is retained in the sump 166 while the drain valve 168 is closed. The drain valve 168 is arranged to open when the pressure differential thereacross is either equalised or reversed. The pressure differential may be equalised when the compressor is taken off load and hence no longer supplies air to the inlet chamber 146. The force urging the valve member 176 against the seat 178 is removed thereby allowing the valve member 176 to move under the force of gravity towards the valve outlet 172.

Liquid retained in the sump 166 can then pass through the valve chamber 174 to the outlet 172 via the bypass channels 180. An annular drain 184 is provided in the base 112 which is in fluid communication with the through holes 120 of the base 112.

Reversal of the pressure differential across the valve 168 occurs during regeneration of the desiccant matrix 130 when dry air is bled back through the cartridge 110. The valve member 176 moves in the manner described above under the influence of the pressure applied through the valve inlet 170. It will be appreciated that any liquid collected in the sump 166 is forced through the valve 168 to the drain 184 and subsequently out of the cartridge 110 via the holes 120. The valve 168 is configured such that not all of the dry air is able to pass therethrough, with the result that a portion of the dry air must pass through the filter 154. As described above, this entrains water and oil retained in the filter 154 which is subsequently vented to atmosphere.

Figure 7:
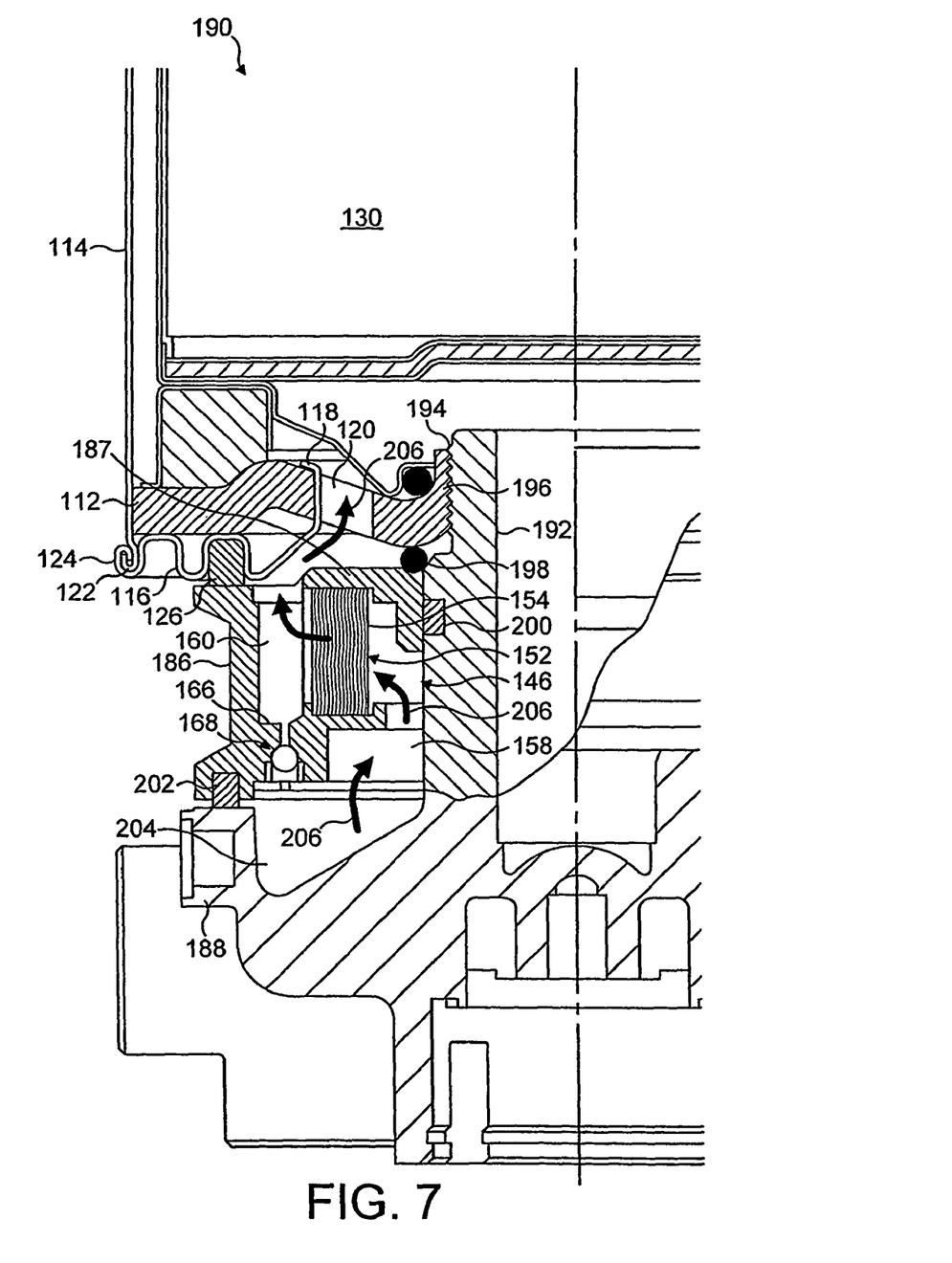
FIGS. 7 and 8 show cross-sectional side views of a filter assembly according to a further aspect of the present invention.
Figure 8:
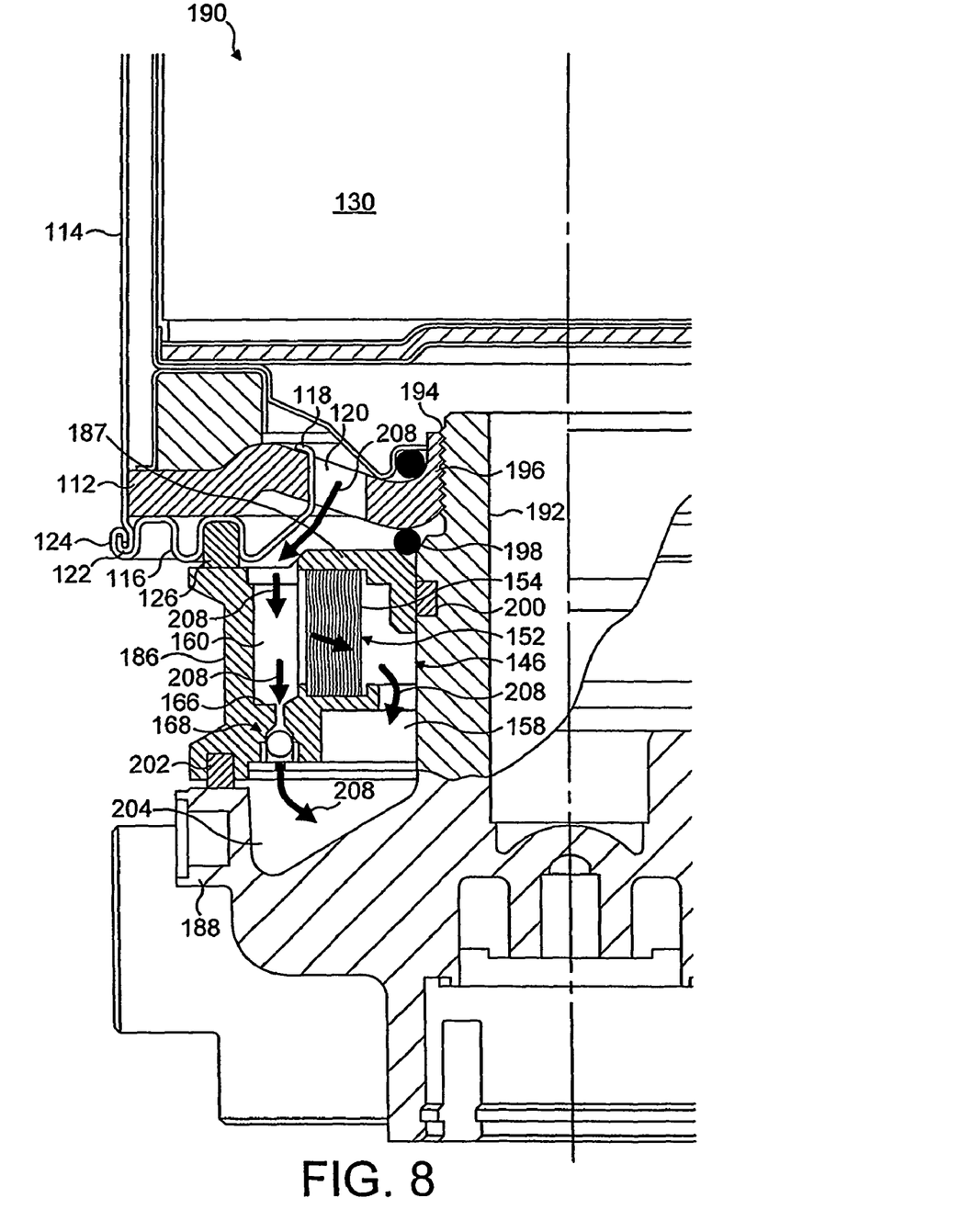

Referring now to FIGS. 7 and 8 there is shown a further embodiment of the present invention. Components common to that of the embodiment of the invention shown in FIGS. 5 to 6b are identified with corresponding reference numerals. The embodiment of FIGS. 7 and 8 differs in that the contaminant filter assembly 152 is provided within a separate housing 186 located between the air dryer body 188 and the desiccant containing cartridge 190. The housing 186 contains the filter element 154, the sump 166, the drain valve 168 and further defines the two portions 158, 160 of the inlet chamber 146. The filter element 154 is retained in the housing by a top plate 187. In the embodiment shown the clamping force between the cartridge 190 and air dryer body 188 is transmitted through an outer wall of the housing 186. It will be appreciated that in an alternative embodiment this force may be transmitted through both the top plate 187 and filter element 154. In such an embodiment the filter element 154 is reinforced so as to be able to accommodate the force transmitted therethrough without deformation or structural failure. Accordingly the filter element 154 may be constructed in a similar manner to that of the embodiment of FIG. 1. i.e. comprising one or more structural members upon which a filter material is mounted. The housing 186 is annular having a central aperture through which a hollow projection 192 of the body 188 passes, in use. The projection 192 is provided with a threaded end portion 194 which is adapted to mate with a corresponding threaded portion 196 of the cartridge base 112.

In use, the housing 186 is sandwiched between the cartridge 190 and the body 188. Sealing rings 126, 198, 200, 202 are provided so as to ensure leak tight seals between the respective components 186, 188, 190. The drain valve 168 has a similar configuration to that of the embodiment of FIGS. 5 to 6b, namely a valve member movable by a pressure differential thereacross to close the valve 168 during the normal flow of air into and through the cartridge 190, and movable to open the valve either by gravity when the compressor is off-load, or by regeneration flow through the cartridge 190.

In use, air from the compressor enters the first portion 158 of the inlet chamber 146 via a port 204 of the air dryer body 188 as indicated by arrows 206. The compressed air then passes through the filter element 154 to the second portion 160 of the inlet chamber 146. As before, oil and water coalesced by the filter element 154 can drain into the sump 166 at the base of the second portion 160. The compressed air then passes though an inlet 120 to the cartridge 190 whereupon it is dried in a conventional manner by the desiccant 130. The sump 166 is drained either by gravity when the supply of air from the compressor is stopped, or by the back flow of dry air through the cartridge 190 to regenerate the desiccant. This second instance is illustrated in FIG. 8 by arrows 208. The liquid from the sump 166 is delivered to the port 204 and thereafter vented to atmosphere through a vent port (not shown) of the air dryer body 188. As before, the regeneration flow of dry air is split between the filter element 154 and the drain valve 168. The portion passing through the filter element 154 entrains any liquid or particulate matter retained by the material of the filter element 154. The portion of the regeneration flow which passes through the drain valve 168 entrains any liquid retained in the sump 166.

The filter assembly 152 of FIGS. 7 and 8 may be used in conjunction with a filter containing cartridge of the type described with reference to FIGS. 1 to 6b to provide additional liquid and debris removal. Alternatively the filter assembly 152 may be used in conjunction with a conventional cartridge containing only desiccant material.

Figure 9:
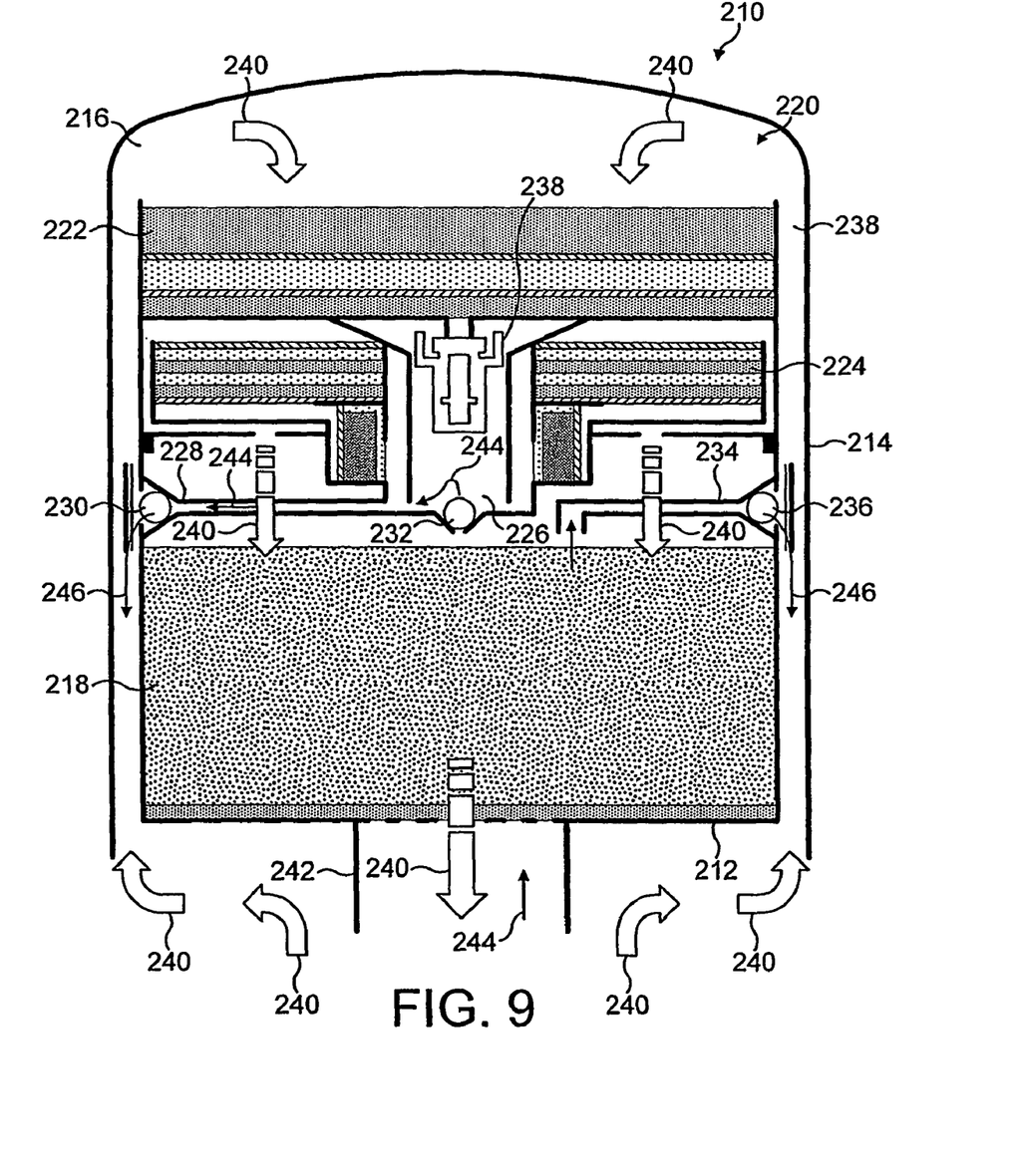
FIG. 9 shows a diagrammatic side view of a further embodiment of an air dryer cartridge according to the present invention.

Referring now to FIG. 9 there is shown a desiccant cartridge, generally designated 210, according to a further embodiment of the present invention. The cartridge 210 comprises a base 212 and a casing 214 defining therebetween a cavity 216. Disposed within the cavity 216 is a desiccant matrix 218 and a contaminant filter assembly 220. The assembly 220 comprises a first filter bed 222, a second filter bed 224, a sump 226, a drain 228 and a drain valve 230. The cartridge 210 further includes a non return valve 232 positioned intermediate the desiccant matrix 218 and the contaminant filter assembly 220, a desiccant regeneration drain 234 and a desiccant regeneration drain valve 236.

In use, air from the compressor is fed to the cartridge 210 in a conventional manner as indicated by arrows 240. The air passes via an annular passage 238 defined between the desiccant matrix 218/contaminant filter assembly 220 and the casing 214 to the top of the cavity 216 before passing successively through the filter beds 222, 224. It will be noted that a non return valve 223 is provided between the beds 222,224 Oil and moisture liberated from the incoming air is deposited in the sump 226. The air then passes through the desiccant matrix 218 whereupon further moisture is removed. The substantially dried air subsequently exits the cartridge 210 through an outlet 242 in the base 212.

Regeneration airflow through the cartridge 210 is indicated by arrows 244. Dry air from a reservoir enters the cartridge 210 through the outlet 242 and passes through the desiccant matrix 218 to liberate moisture retained therein. The majority of this now damp air enters the regeneration drain 234 and is vented to the annular passage 238 through the drain valve 236. A portion of the damp regeneration air enters the sump 226 via the non return valve 232 and thereby urges any liquid retained therein through the drain 228 and drain valve 230 to the annular passage 238. The damp air and any moisture from the sump 226, as indicated by arrows 246, is then vented to atmosphere through a vent of the air dryer body (not shown).

The invention claimed is:

1. An air dryer desiccant cartridge, the cartridge comprising a base having an inlet and an outlet, and a casing connected to the base to define a cavity therebetween, wherein the cavity contains a filter and a desiccant, the filter being arranged upstream of the desiccant such that during normal operation fluid flow entering the cartridge through the inlet passes through the filter and then on to the desiccant before reaching the outlet, and during purging of the cartridge purge flow entering the outlet passes through the desiccant before reaching the filter, wherein further the cartridge includes a valve operable to permit a portion of the purge flow to bypass the filter.

2. An air dryer desiccant cartridge as claimed in claim 1, wherein the valve includes a valve member which is urged to a closed position, thereby preventing the flow of fluid through the valve, by fluid flow entering the cartridge through the inlet.

3. An air dryer desiccant cartridge as claimed in claim 2, wherein the valve member takes the form of a flexible member.

4. An air dryer desiccant cartridge as claimed in claim 3, wherein the flexible member is provided with a proximal portion fixed to a feature of the cartridge and a movable distal portion.

5. An air dryer desiccant cartridge as claimed in claim 3, wherein the flexible member is positioned in a lower region of the cartridge between the filter and the base.

6. An air dryer desiccant cartridge as claimed in claim 1, wherein the valve may comprise a flow passage having a movable valve member contained therein.

7. An air dryer desiccant cartridge as claimed in claim 1, wherein the cartridge further includes a sump associated with the filter.

8. An air dryer desiccant cartridge as claimed in claim 7, wherein the sump is located in the vicinity of the valve such that purge flow directed through the valve entrains any liquid contained in the sump.

9. An air dryer desiccant cartridge as claimed in claim 1, a container within which there is provided the desiccant and a spring arranged to urge the container and filter towards the base, wherein the filter is positioned intermediate the container and the base such that force applied to the container and desiccant by the spring is transmitted to the base through the filter.

10. An air dryer desiccant cartridge as claimed in claim 9, wherein the filter comprises a structural member upon which there is mounted a filter material.

11. An air dryer desiccant cartridge as claimed in claim 10, wherein the filter is cylindrical and comprises an annular structural member upon which there is carried a correspondingly annular filter material arrangement.

12. An air dryer desiccant cartridge as claimed in claim 11, wherein the structural member is provided radially inwardly of the filter material.

13. An air dryer desiccant cartridge as claimed in claim 11, wherein the structural member is provided radially outwardly of the filter material.

14. An air dryer desiccant cartridge as claimed in claims 11, wherein the filter includes a plurality of structural members.

15. An air dryer desiccant cartridge as claimed in claims 11, wherein the desiccant container is substantially cylindrical.

16. An air dryer desiccant cartridge as claimed in claim 15, wherein the container is at least partially received with the annulus of the filter.

17. An air dryer desiccant cartridge as claimed in claim 15, wherein the container comprises a first portion having a diameter less than that of the annulus and a second portion having a diameter greater than that of the annulus.

18. An air dryer desiccant cartridge as claimed in claim 17, wherein the transitional portion of the container between the first and second portions defines a seat configured to receive the filter.

19. An air dryer desiccant cartridge as claimed in claim 1, wherein the base member comprises an upper portion configured to receive the filter of the desiccant cartridge, and a lower portion adapted to rest against the base of the desiccant cartridge, the lower portion further including a flow passage and a blocking means operable to open and close said flow passage.

20. An air dryer desiccant cartridge as claimed in claim 19, wherein the upper portion of the base member is provided with a seat configured to receive and support the filter.

21. An air dryer desiccant cartridge as claimed in claim 20, wherein the seat is provided with one or more engagement features which, in use, serve to locate the filter relative to the base member.

22. An air dryer desiccant cartridge as claimed in claim 21, wherein the engagement features comprise one or more projections.

23. An air dryer desiccant cartridge as claimed in claim 22, wherein the projections take the form of one or more sprung fingers.

24. An air dryer desiccant cartridge as claimed in claim 19, wherein the flow passage is defined by a discontinuity in the lower portion of the base member.

25. An air dryer desiccant cartridge as claimed in claim 24, wherein the blocking means comprise a flexible member spanning said discontinuity.

26. An air dryer desiccant cartridge as claimed in claim 25, wherein the flexible member takes the form of a skirt or rib of a flexible plastics material.

27. An air dryer desiccant cartridge as claimed in claim 19, wherein the lower portion is provided with a plurality of flow passages.

28. An air dryer desiccant cartridge as claimed in claim 27, wherein the flow passages are defined by a plurality of discontinuities.

29. An air dryer desiccant cartridge as claimed in claim 19, wherein the lower portion is provided with a plurality of feet which, in use, rest against the base of a desiccant cartridge, and wherein the flow passages are defined between said feet.

* * * * *